United States Patent
Chirca et al.

(10) Patent No.: US 8,706,940 B2
(45) Date of Patent: Apr. 22, 2014

(54) HIGH FAIRNESS VARIABLE PRIORITY ARBITRATION METHOD

(75) Inventors: Kai Chirca, Richardson, TX (US); Timothy D. Anderson, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 360 days.

(21) Appl. No.: 13/210,732

(22) Filed: Aug. 16, 2011

(65) Prior Publication Data

US 2012/0317322 A1 Dec. 13, 2012

Related U.S. Application Data

(60) Provisional application No. 61/386,151, filed on Sep. 24, 2010.

(51) Int. Cl.
*G06F 12/00* (2006.01)
(52) U.S. Cl.
USPC .......................................... 710/244; 711/158
(58) Field of Classification Search
USPC .................... 710/240–244; 711/154–158
See application file for complete search history.

(56) References Cited

U.S. PATENT DOCUMENTS

2012/0278530 A1* 11/2012 Ebsen ........................... 711/103

* cited by examiner

*Primary Examiner* — Clifford Knoll
(74) *Attorney, Agent, or Firm* — Robert D. Marshall, Jr.; W. James Brady; Frederick J. Telecky, Jr.

(57) ABSTRACT

Multiprocessor systems often share access to a centralized memory and experience conflicting access requests. An arbitration unit mediates priorities of requestor preferably ensuring both priority and fairness. In this invention upon an access conflict the arbitrator grants access to one requestor having the highest priority level and stalls other conflicting requestors. If plural requestors have the same priority level, the arbiter grants access to one and stalls the others. The arbiter then adjusts the priority levels of the requestors. The priority of the requestor granted access is decreased by the number of stalled requestors. The stalled requestors have their priority levels increased by one. The arbitration decision is thus based on the stall history and the caused stall history of each requestor.

10 Claims, 2 Drawing Sheets

HIGH FAIRNESS VARIABLE PRIORITY ARBITRATION METHOD

CLAIM OF PRIORITY

This application claims priority under 35 U.S.C. 119(e)(1) to U.S. Provisional Application No. 61/386,151 filed Sep. 24, 2010.

TECHNICAL FIELD OF THE INVENTION

The technical field of this invention is arbitration of access to a shared resource.

BACKGROUND OF THE INVENTION

Microprocessor systems employing multiple processors and a combination of local and shared memory are becoming increasingly common. Such systems normally have wide interconnect busses carrying data and control information from one subsystem to another. Such systems generally have bus arbitration and access issues in accessing multiple-port memory. Busses are generally controlled by the specific processor module sending information to other modules. A classical challenge in such systems is bus arbitration that resolves collisions between separate modules striving for control of the bus.

In most DSP applications multiple port memory accesses are needed for high performance and high data bandwidth. Generally, simultaneous accesses of all ports are allowed for a wide range of applications and task synchronizations. But when multiple ports request accesses to the same memory bank, an arbiter resolves the memory conflict by enabling one request but stalling the others. Because multi-ported memory accesses may generate random conflicts among the ports in any given cycle, every port has an equal opportunity to conflict with every other port.

Fixed priority arbitration is easiest to comprehend. Table 1 shows an example of a four-port memory with fixed port priorities.

TABLE 1

| Port Number | Priority Value |
|---|---|
| 0 | 3 |
| 1 | 2 |
| 2 | 1 |
| 3 | 0 |

A lower priority port will be able to access the memory only if its access request does not conflict with a higher priority port. This is completely unfair because port 0 will never be stalled while port 3 will always be stalled should a conflict situation arise. Arbitration should assure some degree of fairness.

Consider three classic possible solutions: iterative arbiter; oblivious arbiter; and round-robin arbiter. An iterative arbiter operates by changing the priority assignments on completion of each cycle. An oblivious arbiter does not consider the history of requests and access. The priority assignments can be generated with shift registers that rotate by one position each cycle or by decoding the output of a random number generator. Oblivious arbiters thus apply weak fairness protocols because they do not take the stall histories and current requests into account. If the same set of ports continuously conflict in synchronism with the shift register cycles, one of the ports will always win. Implementation of the random number generator is complex and costly. A round-robin arbiter achieves a higher degree of fairness by assigning the lowest priority value to the requesting port just served. Priority index numbers tend to be reduced faster than they are increased because of the random number of conflicts on different ports. When the priority index number reaches the minimum, it does not reduce further but stays fixed until a stall happens to resume normal behavior. When the priority number hits the top and bottom limits and no longer shows an accurate priority value, the arbitration mechanism ceases to behave fairly.

FIG. 1 illustrates a simplified example of a prior art four-processor system. Arbitration unit 118 determines access to shared memory 100. Four processors 111 through 114 share access to shared memory 100. Paths 105 through 108 establish communication of requests and priorities between each processor and arbitration unit 118. Arbitration unit 118 passes access decisions via a two-bit selection signal 109 to a control input of multiplexer 110. Paths 101 through 104 provide write data paths from respective processors 111 through 114 to multiplexer 110. Read return data passes from shared memory 100 to processors 111 through 114 via path 116. Arbitration unit 118 determines which processor receives the return data via control inputs 105 through 108.

SUMMARY OF THE INVENTION

This invention is a high fairness arbiter mechanism which is a robust solution to the challenge of fair access in dealing with multiple requestors trying to access a single shared resource. This mechanism ensures that when two or more requests attempt to access the same resource, that no one requester wins more often than the others. The invention has a higher degree of fairness than a round-robin arbiter. In the event of a conflict, the priorities of the ports will change according to a fairness algorithm. The fairness algorithm is simple and elegant and can be effectively implemented in hardware. The arbitration decision is based on the stall history of each port and the number of stalled ports it caused in the process of gaining access.

BRIEF DESCRIPTION OF THE DRAWINGS

These and other aspects of this invention are illustrated in the drawings, in which.

DETAILED DESCRIPTION OF PREFERRED EMBODIMENTS

The present invention is a robust solution to the fairness issue in arbitration of access to shared resources. In the event of a conflict, the priorities of the ports will change according following algorithm shown in pseudo-code. This pseudo-code is executed by the arbitration unit. Note that this operation could be implemented by a state machine or a micro-coded machine. Presentation of this operation as pseudo-code does not imply either implementation but merely represents a convenient manner to explain the operation of this invention. Note that if only one processor 111, 112, 113 or 114 requests access, that single requesting processor is granted access.

Upon such a non-conflicting access request no changes are made in any processor priority. There is no change in processor priority because granting the single requesting processor access does not stall any other processor. This pseudo-code is illustrates only examples of plural conflicting access requests.

```
If (N ports are in conflict) then
    if (port i has the highest priority) then
        port i granted access;
        all other requesting ports are stalled;
        priority of granted port reduced by (N-1);
        priority of stalled ports increased by 1;
    else if (plural ports have highest priority) then
        one port with the highest priority granted
            access (random selection or fixed
            priority);
        all other requesting ports are stalled;
        priority of granted port reduced by (N-1);
        priority of stalled ports increased by 1;
    endif
    endif
endif
```

The pseudo-code determines if one port has the highest priority. If so, this port is granted access. The priorities of all requesting ports are adjusted. The granted port has its priority reduced by N-1, the number requesting ports stalled when it was granted access. The priority of the stalled ports is increased by 1.

If plural ports have the same highest priority, only one port is granted access. This one port is selected arbitrarily. This arbitrary selection may be random or according to a fixed priority rule. In the preferred embodiment this arbitrary selection of the granted port uses a fixed priority based upon port number. Each potential requesting port is assigned a unique port number. The requesting port of the set having the same highest priority level having the least port number is granted access in this case. Note other arbitrary selection methods are feasible. The priorities of all requesting ports are adjusted. The granted port has its priority reduced by N-1, the number of requesting ports stalled when it was granted access. The priority of the stalled ports is increased by 1.

Figure 2:
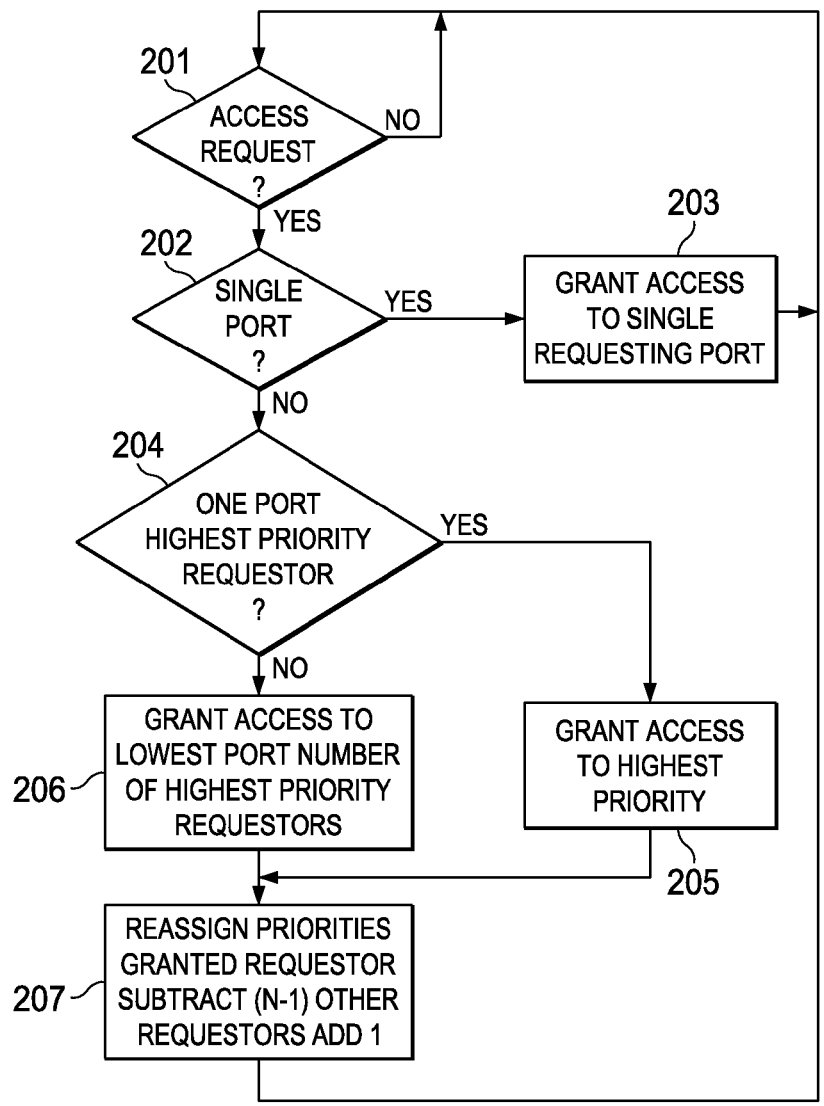
FIG. 2 illustrates in flow chart form the operation of this invention.

FIG. 2 illustrates this operation in flow chart form. As noted above showing this operation in flow chart form is merely a convenient manner of description and does not preclude implementation via a state machine. FIG. 2 begins at test block 201. Test block 201 determines if one or more accesses are requested in the current cycle. If this is not the case (No at test block 201), then test block 201 repeats for the next cycle. If this is the case (Yes at test block 201), then flow proceeds to test block 202.

Test block 202 determines if there is a single requesting port. If there is a single requesting port (Yes at test block 202), then flow proceeds to block 203. Block 203 grants access to the single requesting port. The single requesting port performs its access. Following this access flow returns to test block 201. No port priorities are changed in this event.

If test block 202 determines there are plural, conflicting requesting ports (No at test block 202), arbitration unit 118 must resolve the conflict. Test block 204 determines whether one of the requesting ports has a highest priority. In accordance with this invention each requesting port is assigned a priority level among a plurality of possible priorities. These priority levels are arranged in order from highest to lowest. Decision block 204 determines if one and only one of the N requesting port has a highest priority level. If there is a single requesting port having a highest priority (Yes at test block 204), then that requesting port is granted access (block 205). The granted requesting port performs its access. Following this access flow proceeds to block 207 which will be further described below.

If plural requesting ports have the same highest priority level (No at test block 204), then block 206 arbitrarily selects one of these requesting ports for access. This arbitrary selection may be random or according to a fixed priority rule. As described above and illustrated here in FIG. 2 this selection is preferably based upon the port number of the requesting ports having the same highest priority. The granted requesting port performs its access. Following this access flow proceeds to block 207.

Block 207 changes the priority levels of each of the conflicting requesting ports. Arbitration unit 118 grants access to exactly one of the requesting ports. This is either the requesting port with the highest priority (block 203) or the arbitrarily selected requesting port among the plural requesting ports having the highest priority (block 206). Of the N requesting ports there are thus N-1 stalled requesting ports. The requesting port just granted access has its priority reduced by the number of stalled requesting ports N-1. The priority level of each stalled requesting port is incremented by 1. FIG. 2 differs from the pseudo-code listed above in combining the priority reassignment code in a single block. The pseudo-code listed above shows separate priority reassignment code when granting access to the requesting port with the highest priority or to the arbitrarily selected requesting port among the plural requesting ports having the highest priority. This difference is merely a difference in implementation of the invention.

Following block 207 returns to text block 201 to detect whether another access or accesses are requested. Generally any stalled requesting port will generate another access request which may be conflicting and re-enter the arbitration process in a following cycle.

Figure 1:
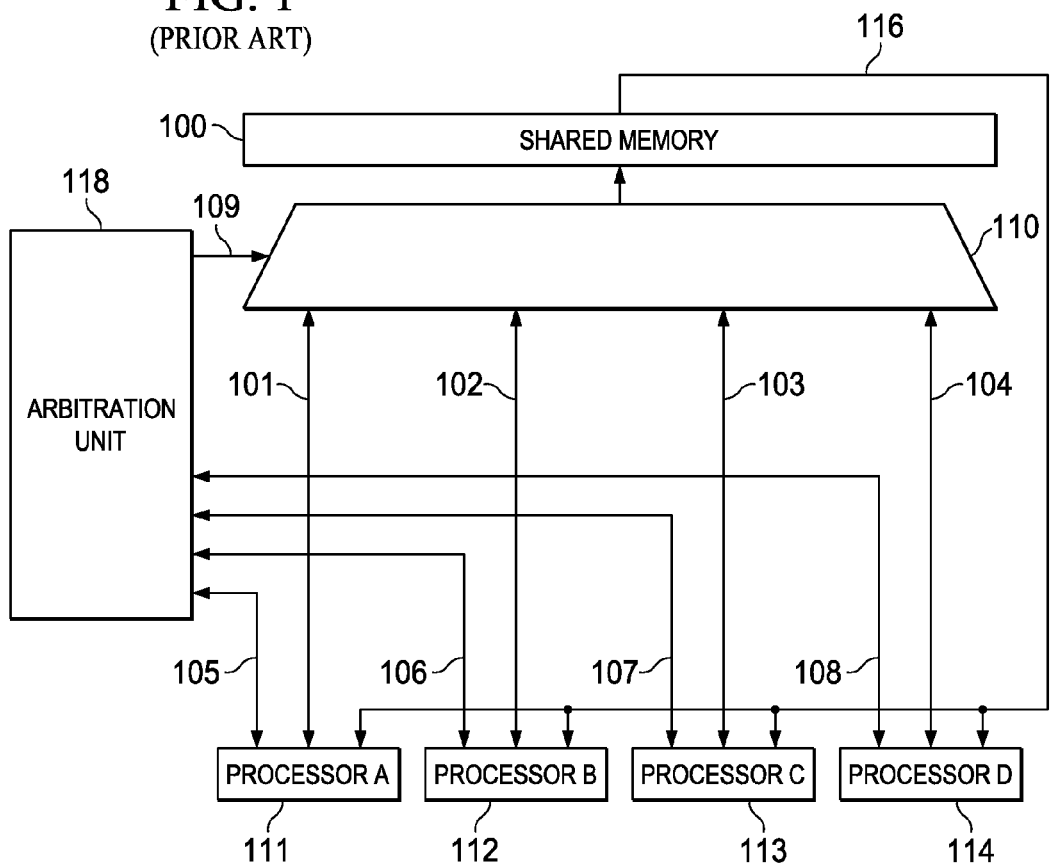
FIG. 1 illustrates a simplified example of a four-processor system having shared memory and access arbitration (Prior Art)
Figure 3:
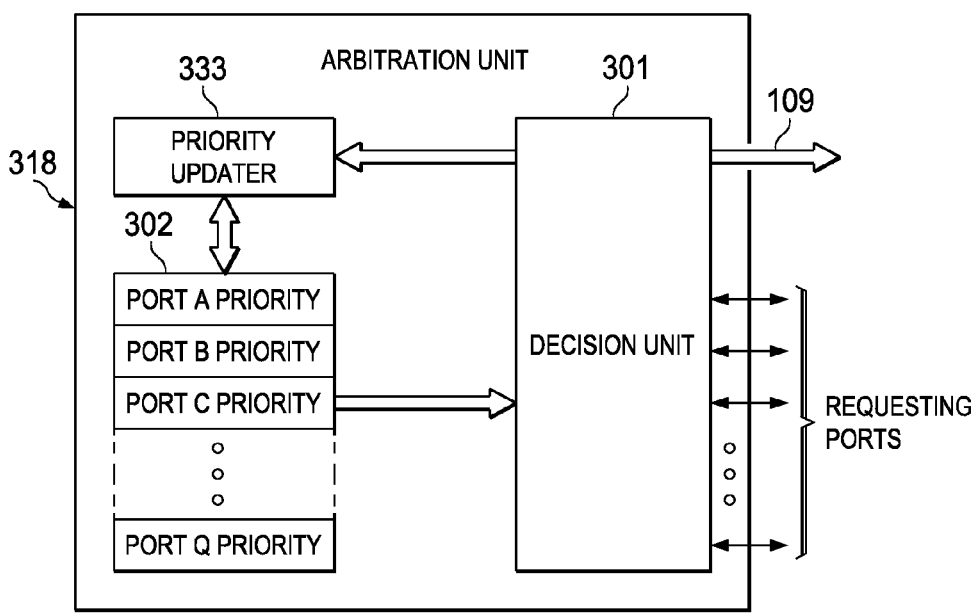
FIG. 3 illustrates an arbitration unit according to this invention.

FIG. 3 illustrates arbitration unit 318 of this invention. Arbitration unit 318 substitutes for arbitration unit 118 of FIG. 1. Decision unit 301 receives signals from the requesting ports (corresponding to lines 105, 105, 107 and 108 illustrated in Figure). Decision unit 301 is responsive the port priority data stored in priority register file 302. As illustrated in FIG. 3 priority register file 302 stores separate priorities for ports A, B, C . . . Q. Upon receiving one or more access requests from the requesting ports decision unit 301 performs the arbitration operation of this invention based upon priority data stored in priority register file 302. Decision unit 301 generates a selection signal 109 used in selecting the address and/or write data path as illustrated in FIG. 1. Decision unit 301 communicates arbitration decisions to requesting ports as previously described in conjunction with FIG. 1. Decision unit 301 triggers priority updater 303 to update the port priority data stored in priority register file 302 as previously described.

Consider an example sequence of requests of a four-port system such as illustrated in FIG. 1. In this example each of the requesting ports processors 111, 112, 113 and 114 generates access requests on the same time scale and if stalled generates new access requests in the next cycle until serviced. In a first cycle, all ports have a 0 priority and none are requesting access. Thus no port is granted access and the priority levels are unchanged as summarized in Table 2.

TABLE 2

| Requests | | | | | New Priority | | | |
|---|---|---|---|---|---|---|---|---|
| Port A | Port B | Port C | Port D | Grant | Port A | Port B | Port C | Port D |
| 0 | 0 | 0 | 0 | — | 0 | 0 | 0 | 0 |

In a second cycle, all four ports request access. Since all four ports have a priority level of 0, arbitration selects the port with the lowest port number. In this example this is port A. Following access grant the arbitration reassigns the priority levels. Port A which was granted access caused stalls in three ports, port B, port C and port D. The port A priority level is decreased by the number of blocked ports (N−1 where N is the number of requestors 4). Thus the port A priority is reassigned to −3. The priority of each blocked port (ports B, C, D) is increased by 1. Table 3 summarizes this cycle.

TABLE 3

| Requests | | | | | New Priority | | | |
|---|---|---|---|---|---|---|---|---|
| Port A | Port B | Port C | Port D | Grant | Port A | Port B | Port C | Port D |
| 1 | 1 | 1 | 1 | Port A | −3 | 1 | 1 | 1 |

In a third cycle only the three ports blocked in the second cycle (ports B, C and D) request access. As shown in Table 3, each of these ports has the same priority level of 1. Arbitration selects the port with the lowest port number which is port B in this case. Arbitration reassigns priority levels. The priority of port A is unchanged because port A did not request access. The priority of port B is reduced by 2 (N−1 where N is 3) because granting access blocked two ports (ports C and D). The priority of ports C and D are each increased by 1. Table 4 summarizes this cycle.

TABLE 4

| Requests | | | | | New Priority | | | |
|---|---|---|---|---|---|---|---|---|
| Port A | Port B | Port C | Port D | Grant | Port A | Port B | Port C | Port D |
| 0 | 1 | 1 | 1 | Port B | −3 | −1 | 2 | 2 |

In a fourth cycle only the two ports blocked in the third cycle (ports C and D) request access. As shown in Table 4, each of these ports has the same priority level of 2. Arbitration selects the port with the lowest port number which is port C in this case. Arbitration reassigns priority levels. The priorities of ports A and B are unchanged because ports A and B did not request access. The priority of port B is reduced by 1 (N−1 where N is 2) because granting access blocked one port (port D). The priority of port D is increased by 1. Table 5 summarizes this cycle.

TABLE 5

| Requests | | | | | New Priority | | | |
|---|---|---|---|---|---|---|---|---|
| Port A | Port B | Port C | Port D | Grant | Port A | Port B | Port C | Port D |
| 0 | 0 | 1 | 1 | Port C | −3 | −1 | 1 | 3 |

In a fifth cycle only port D blocked in the fourth cycle request access. Because port D is the only requestor it is granted access. Arbitration does not reassign priority levels in this case because there were no access request conflicts. Table 6 summarizes this cycle.

TABLE 6

| Requests | | | | | New Priority | | | |
|---|---|---|---|---|---|---|---|---|
| Port A | Port B | Port C | Port D | Grant | Port A | Port B | Port C | Port D |
| 0 | 0 | 0 | 1 | Port D | −3 | −1 | 1 | 3 |

In a sixth cycle, no ports request access. Thus no port is granted access and the priority levels are unchanged as summarized in Table 7.

TABLE 7

| Requests | | | | | New Priority | | | |
|---|---|---|---|---|---|---|---|---|
| Port A | Port B | Port C | Port D | Grant | Port A | Port B | Port C | Port D |
| 0 | 0 | 0 | 0 | — | −3 | −1 | 1 | 3 |

In a seventh cycle, all four ports request access. Port D has the highest priority of 3 and is granted access. Following access grant the arbitration reassigns the priority levels. Port D which was granted access caused stalls in three ports, port B, port C and port D. The port D priority level is decreased by the number of blocked ports (N−1 where N is the number of requestors 4) to 0. The priority of each blocked port (ports A, B and C) is increased by 1. Table 8 summarizes this cycle.

TABLE 8

| Requests | | | | | New Priority | | | |
|---|---|---|---|---|---|---|---|---|
| Port A | Port B | Port C | Port D | Grant | Port A | Port B | Port C | Port D |
| 1 | 1 | 1 | 0 | Port D | −2 | 0 | 2 | 0 |

In an eighth cycle only the three ports blocked in the seventh cycle (ports A, B and C) request access. Arbitration selects port C with the highest priority level of 2 for access. Arbitration reassigns priority levels. The priority of port D is unchanged because port D did not request access. The priority of port C is reduced by 2 (N−1 where N is 3) because granting access blocked two ports (ports A and B). The priority of ports A and B are each increased by 1. Table 9 summarizes this cycle.

TABLE 9

| Requests | | | | | New Priority | | | |
|---|---|---|---|---|---|---|---|---|
| Port A | Port B | Port C | Port D | Grant | Port A | Port B | Port C | Port D |
| 1 | 1 | 1 | 0 | Port C | −1 | 1 | 0 | 0 |

In a ninth cycle only the two ports blocked in the eighth cycle (ports A and B) request access. Port B has the highest priority level of these two requestors. Thus arbitration grants access to port B. Arbitration reassigns priority levels. The priorities of ports C and D are unchanged because ports C and D did not request access. The priority of port B is reduced by 1 (N−1 where N is 2) because granting access blocked one port (port A). The priority of blocked port A is increased by 1. Table 10 summarizes this cycle.

TABLE 10

| Requests | | | | | New Priority | | | |
|---|---|---|---|---|---|---|---|---|
| Port A | Port B | Port C | Port D | Grant | Port A | Port B | Port C | Port D |
| 1 | 1 | 0 | 0 | Port B | 0 | 0 | 0 | 0 |

In a tenth cycle only port A blocked in the ninth cycle request access. Because port A is the only requestor it is granted access. Arbitration does not reassign priority levels in this case because there were no access request conflicts. Table 11 summarizes this cycle.

TABLE 11

| Requests | | | | | New Priority | | | |
|---|---|---|---|---|---|---|---|---|
| Port A | Port B | Port C | Port D | Grant | Port A | Port B | Port C | Port D |
| 1 | 0 | 0 | 0 | Port A | 0 | 0 | 0 | 0 |

This returns the priority levels to those of the first cycle (Table 2). Thus if all four requestors request access the process noted above will repeat. Note that the order of access grant following the first four request cycle of A, B, C and D is reversed following the second four request cycle (D, C, B, A).

Summarizing the cases for a four-port arbitration system we have:

Case 1: When a single port requests access, it is granted access and the priorities of all ports are unchanged.

Case 2: When there are plural requestors but a single requestor has the highest priority, it is granted access and the other ports are stalled. The priority level of the port granted access decreases by 1. The priority level of the other ports in conflict increases by 1.

Case 3: When two ports having the same priority level request access, the lowest number port wins access. The priority level of that port decreases by 1. The other port in conflict is stalled and its priority level increases by 1.

Case 4: When three ports each having the same priority level request access, the lower port number wins access. The port granted access has its priority level reduced by 2. The other ports in conflict have their priority levels increased by 1 each.

Case 5: When all four ports each having the same priority level request access, the lower port number wins access. The arbiter reduces the priority level of the port granted access by 3. The arbiter increases the other three ports priority levels by 1 each.

In this invention the sum of the priority level of all ports will be the same for every single cycle. In the event of a conflict, the arbiter gives the stalled ports an equal increase in their priorities. At the same time it reduces the priority of the non-stalled port based on how many ports it has blocked. Therefore one port granted access over another port will be blocked the next time it conflicts with the same port. If the same two ports are in repeated conflict, the access will be given to the conflicting ports alternatively. When three ports are in repeated conflict, one port wins the access and blocks the other two. The port granted access has its priority level reduced by two. This makes it twice as unlikely for that port to win over the other two ports in a consequent conflict.

According to this invention the arbitration decision based on the stall history of each port and the number of stalled ports it has caused to stall in winning access. If the addresses generated by the four ports are purely random, the priorities will be evened out among the four ports, making sure that no one port is blocked more than any other.

When all the ports in conflict are at the same priority level, the arbiter makes an arbitrary access decision. In the preferred embodiment a fixed priority mechanism (port number) always let the lower number port win. This is a trade off between ease of hardware implementation and fairness ratio.

It is useful to define a fairness ratio and winning ratio as given in the following formulae:

$$FR = \frac{WR_{min}}{WR_{max}}$$

where: FR is the fairness ratio; WR is the winning ratio equal to t number of wins in conflicts divided by the number of conflicts; $WR_{min}$ is the minimum port winning ratio among all ports; and $WR^{max}$ is the maximum port winning ratio among all ports. A Fairness Ratio of 1 implies ideal fairness or $WR_{min}$ equals $WR_{max}$. A Fairness Ratio of 0 implies complete unfairness.

Table 12 shows the results of a C-code simulation of 50,000 requests in a four port system with all four ports requesting access pseudo-randomly. Table 12 shows the conflicts, stalls and winning ratio for the port with the best winning ratio and the port with the worst winning ratio for each of three priority techniques. Table 12 also shows the fairness ratio for each of the three priority techniques from the simulation. The three priority techniques compared are: fixed priority; round robin priority; and the technique of this invention.

TABLE 12

| | Fixed Priority | | Round Robin | | Invention | |
|---|---|---|---|---|---|---|
| | Best Port | Worst Port | Best Port | Worst Port | Best Port | Worst Port |
| Conflicts | 8,172 | 8,702 | 8,400 | 8,553 | 5,480 | 8,573 |
| Stalls | 0 | 8,702 | 3,410 | 5,146 | 4,334 | 4,380 |
| Winning Ratio (WR) | 100% | 0% | 59.4% | 39.8% | 48.89% | 48.91% |
| Fairness Ratio (FR) | 0% | | 67.1% | | 99.96% | |

The prior art fixed priority technique is completely unfair. The best port always wins conflicts and the worst port always loses conflict. The prior art round robin technique is considerably better with a fairness ratio of 67.1%. The priority technique of this invention is nearly perfectly fair with a fairness ratio of 99.96%.

The number of priority levels needed in this invention is in the range of $(1, 2^{N-1})$ or $(-2^{N/2}, 2^{N/2})$ where N is the number of ports. Thus in a four port system each port needs only three bits to store the priority level. A 4-bit number can store the needed priority levels for an eight port system. This limited range makes hardware implementation of this invention simple, elegant and efficient. The fixed total sum of the priority levels of all ports is the key to guaranteeing fairness while keeping the number of priority levels within a limited arbitrary range.

The invention provides a greatly simplified implementation and achieves an almost ideal fairness while prior solutions require significantly more resources to reach generally lower fairness ratings.

What is claimed is:

1. A method of granting access to a shared resource by plurality of requestors, comprising the steps of:
   if a single requestor seeks access, granting access to the single requestor;
   if plural requestors seek access and a single requestor has a highest priority level
      granting access to the highest priority single requestor and stalling other requestors,
      changing a priority level of the requestor granted access by subtracting the number of stalled requestors, and
      changing the priority levels of each stalled requestor by adding one; and
   if plural requestors seek access and plural requestors have the same highest priority level
      arbitrarily granting access to one of the plural requestors having the same highest priority level and stalling other requestors,
      changing the priority level of the requestor granted access by subtracting a number of stalled requestors, and
      changing the priority levels of each stalled requestor by adding one.

2. The method of claim 1, further comprising:
   said step of arbitrarily granting access to one of the plural requestors grants access a randomly selected one of the plural requestors having the same highest priority level.

3. The method of claim 1, further comprising:
   said step of arbitrarily granting access to one of the plural requestors grants access to one of the plural requestors having the same highest priority level according to a fixed priority.

4. The method of claim 3, further comprising:
   assigning a unique port number to each of the plurality of requestors; and
   said step of arbitrarily granting access to one of the plural requestors according to a fixed priority grants access to one of the plural requestors having a lowest port number.

5. The method of claim 1, wherein:
   the plurality of requestors comprises a plurality of data processors in a multiprocessor system; and
   the shared resource comprises a shared memory.

6. An electronic system comprising:
   a shared resource;
   a plurality of resource requestors, each operable to request access to said shared resource and to interact with said shared resource if granted access; and
   an arbitration unit connected to said shared resource and each of said plurality of requestors, said arbitration unit including
      a priority register file storing a priority level for each of said plurality of resource requestors,
      a priority updater connected to said priority register file operable to update priority levels stored in said priority register file, and
      a decision unit responsive to access requests from said plurality of resource requestors and connected to said priority register file and said priority updater, said decision unit operable to
         if a single requestor requests access, granting access to the single requestor,
         if plural requestors request access and a single requestor has a highest priority level, granting access to the highest priority single requestor and stalling all other requestors,
         if plural requests request access and plural requestors have the same highest priority level, arbitrarily granting access to one of the plural requestors having the same highest priority level and stalling all other requestors, and
         controlling said priority updater to update said priority levels stored in said priority register file by
            subtracting the number of stalled requestors from the priority level corresponding to a requestor whose access grant stalled other requestors, and
            adding one to the priority level corresponding to a requestor whose access was stalled.

7. The electronic system of claim 6, wherein:
   said decision unit arbitrarily grants access to one of the plural requestors having the same highest priority level by granting access to a randomly selected one of the plural requestors having the same highest priority level.

8. The decision unit of claim 6, wherein:
   said decision unit arbitrarily grants access to one of the plural requestors having the same highest priority level according to a fixed priority.

9. The decision unit of claim 8, wherein:
   each of said plurality of requestors is assigned a unique port number; and
   said decision unit arbitrarily grant access to one of the plural requestors having the same highest priority level by granting access to one of the plural requestors having a lowest port number.

10. The electronic of claim 6, wherein:
    said plurality of requestors comprises a plurality of data processors in a multiprocessor system; and
    said shared resource comprises a shared memory.

* * * * *